United States Patent
Arnegaard et al.

(10) Patent No.: US 8,145,464 B2
(45) Date of Patent: Mar. 27, 2012

(54) OILFIELD OPERATIONAL SYSTEM AND METHOD

(75) Inventors: Truls Arnegaard, Oslo (NO); Eric Jonathan Schoen, Bellaire, TX (US); Sherrill Brekke, Houston, TX (US); Kerry Huguet, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 845 days.

(21) Appl. No.: 11/934,052

(22) Filed: Nov. 1, 2007

(65) Prior Publication Data

US 2008/0109490 A1    May 8, 2008

Related U.S. Application Data

(60) Provisional application No. 60/856,065, filed on Nov. 2, 2006.

(51) Int. Cl.
*G06G 7/48* (2006.01)

(52) U.S. Cl. .......................................................... 703/10

(58) Field of Classification Search .................. 703/6, 10; 700/1; 717/100
See application file for complete search history.

(56) References Cited

U.S. PATENT DOCUMENTS

| | | | |
|---|---|---|---|
| 5,992,519 A | 11/1999 | Ramakrishnan et al. | |
| 6,422,312 B1 | 7/2002 | Delatorre et al. | |
| 6,434,435 B1 | 8/2002 | Tubel et al. | |
| 6,826,483 B1 * | 11/2004 | Anderson et al. | 702/13 |
| 6,980,940 B1 | 12/2005 | Gurpinar et al. | |
| 2002/0049625 A1 | 4/2002 | Kilambi et al. | |
| 2004/0220846 A1 * | 11/2004 | Cullick et al. | 705/8 |
| 2004/0221261 A1 * | 11/2004 | Blevins | 717/107 |
| 2006/0113110 A1 | 6/2006 | Leuchtenberg | |

FOREIGN PATENT DOCUMENTS

WO    2004049216    6/2004

OTHER PUBLICATIONS

International Search Report from International Application No. PCT/US2007/083447, dated Jun. 4, 2008, 2 pages.

* cited by examiner

*Primary Examiner* — David Silver

(57) ABSTRACT

Techniques relating to an oilfield application for performing at least one oilfield operation are provided. The oilfield application is provided with a plurality of oilfield application modules, an application shell for defining an oilfield application, an adapter for encapsulating at least one of the oilfield application modules for compatibility with the application shell, and integration services for integrating the application modules into the application shell. Each of the oilfield application modules performs at least one task of an oilfield operation. The application shell is adapted to selectively receive the oilfield application modules. The loading services load the application modules into the application shell, the loading services initializing the application modules. The integrating services integrate the application modules for operability with the application shell whereby the at least one oilfield operation is enabled.

25 Claims, 6 Drawing Sheets

OILFIELD OPERATIONAL SYSTEM AND METHOD

CROSS REFERENCE TO RELATED APPLICATIONS

This application claims priority under 35 U.S.C. §119 from Provisional Patent Application No. 60/856,065 filed Nov. 2, 2006.

BACKGROUND OF THE INVENTION

1. Field of the Invention

The present invention relates to techniques for creating oilfield applications for use in performing oilfield operations.

2. Background of the Related Art

Oilfield operations involve various sub-operations used to locate and gather valuable hydrocarbons. Various tools, such as seismic tools, are often used to locate the hydrocarbons. One or more wellsites may be positioned along an oilfield to locate and gather the hydrocarbons from subterranean reservoirs of the oilfield as shown in FIG. 1. The wellsites are provided with tools capable of advancing into the ground and removing hydrocarbons from the subterranean reservoirs as shown in FIG. 2A. Production facilities are positioned at surface locations to collect the hydrocarbons from the wellsite(s). Fluid is drawn from the subterranean reservoir(s) and passes to the production facilities via transport mechanisms, such as tubing. Various equipment is positioned about the oilfield to monitor and manipulate the flow of hydrocarbons from the reservoir(s) as shown in FIG. 2B.

During oilfield operations, it is often desirable to monitor various oilfield parameters, such as fluid flow rates, composition, etc. Sensors may be positioned about the oilfield to collect data relating to the wellsite and the processing facility, among others. For examples, sensors in the wellbore may monitor fluid composition, sensors located along the flow path may monitor flow rates and sensors at the processing facility may monitor fluids collected. The monitored data is often used to make real-time decisions at the oilfield. Data collected by these sensors may be further analyzed and processed.

The processed data may be used to determine conditions at the wellsite(s) and/or other portions of the oilfield, and make decisions concerning these operations. Operating parameters, such as wellsite setup, drilling trajectories, flow rates, wellbore pressures, production rates and other parameters, may be adjusted based on the received information. In some cases, known patterns of behavior of various oilfield configurations, geological factors, operating conditions or other parameters may be collected over time to predict future oilfield operations.

Oilfield data is often used to monitor and/or perform various oilfield operations. There are numerous factors that may be considered in operating an oilfield. Thus, the analysis of large quantities of a wide variety of data is often complex. Over the years, oilfield applications have been developed to assist in processing data. For example, simulators, or other scientific applications, have been developed to take large amounts of oilfield data and to model various oilfield operations. Typically, there are different types of simulators for different purposes. Examples of these simulators are described in U.S. Pat. No. 5,992,519, WO2004049216 and U.S. Pat. No. 6,980,940.

Numerous oilfield operations, such as drilling, evaluating, completing, monitoring, producing, simulating, reporting, etc., may be performed. Typically, each oilfield operation is performed and controlled separately using separate oilfield applications that are each written for a single purpose. Thus, many such operations are often performed using separate oilfield application. In some cases, it may be necessary to develop special applications, or modify existing applications to provide the necessary functionality.

Certain techniques have been developed for creating general applications to perform various tasks. Techniques have also been developed to provide plug-ins to expand the functionality of oilfield simulators. Despite the advancements in development of applications and oilfield plug-ins, there remains a need to develop techniques for creating oilfield applications capable of integrating a wide variety of individual oilfield applications (sometimes referred to as oilfield modules) needed to perform various oilfield tasks and/or operations. It would be desirable to have a flexible system capable of selecting oilfield modules, and adapting those modules for use in an oilfield application. It is further desirable that such techniques be capable of one of more of the following, among others: interfacing with multiple oilfield modules of various types, hosting an oilfield application according to defined constraints, performing a wide variety of oilfield tasks and/or operations, selectively performing one or more oilfield tasks and/or operations in a desired sequence and/or format, selectively integrating the functionality of various modules into the oilfield application, providing for selective interaction between modules as desired, adapting modules for use in a desired oilfield application format, and converting pre-existing oilfield applications for use with the oilfield application.

SUMMARY OF THE INVENTION

In general, in one aspect, the present invention relates to an oilfield application for performing an oilfield operation for an oilfield having a subterranean formation for extracting fluid from an underground reservoir therein. The oilfield application is provided with a plurality of oilfield application modules, an application shell for defining an oilfield application, an adapter for encapsulating at least one of the oilfield application modules for compatibility with the application shell, and integration services for integrating the application modules into the application shell. Each of the oilfield application modules performs at least one task of an oilfield operation. The application shell is adapted to selectively receive the oilfield application modules. The loading services load the application modules into the application shell and initialize the application modules. The integrating services integrate the application modules for operability with the application shell whereby the at least one oilfield operation is enabled In general, in one aspect, the invention relates to a method of performing an oilfield operation. The oilfield has a subterranean formation for extracting fluid from an underground reservoir therein. The method includes obtaining an application shell for forming oilfield application, obtaining a plurality of oilfield modules, each of the plurality of oilfield modules adapted to perform at least one oilfield task of the oilfield application, selectively loading the oilfield modules into the oilfield application, selectively encapsulating at least one of the oilfield modules for compatibility with the application shell, selectively integrating the oilfield modules into a format for operability with the oilfield application and selectively performing the oilfield tasks.

In general, in one aspect, the invention relates to a method for performing an oilfield operation of an oilfield having a subterranean formation for extracting fluid from an underground reservoir therein. The method includes coupling a first oilfield application to an application shell via an application programming interface and a linking module, obtaining a plurality of oilfield modules, each of the plurality of oilfield modules adapted to perform at least one oilfield task of a second oilfield application, selectively loading the plurality of oilfield modules into the application shell to form the second oilfield application, selectively encapsulating at least one of the plurality of the oilfield modules for compatibility with the application shell, selectively integrating the plurality of oilfield modules into a format for operability with the application shell, and cooperatively performing the at least one oilfield task based on the first oilfield application and the second oilfield application.

In general, in one aspect, the invention relates to a computer readable medium, embodying instructions executable by a computer to perform method steps for performing an oilfield operation of an oilfield having a subterranean formation for extracting fluid from an underground reservoir therein, the instructions comprising functionality to obtain a plurality of oilfield modules, each of the plurality of oilfield modules adapted to perform at least one oilfield task of an oilfield application, selectively load the plurality of oilfield modules into an application shell to form the oilfield application, selectively encapsulate at least one of the plurality of the oilfield modules for compatibility with the application shell, selectively integrate the plurality of oilfield modules into a format for operability with the application shell, and selectively perform the at least one oilfield task.

In general, in one aspect, the invention relates to a computer readable medium, embodying instructions executable by a computer to perform method steps for performing an oilfield operation of an oilfield having a subterranean formation for extracting fluid from an underground reservoir therein, the instructions comprising functionality to couple a first oilfield application to an application shell via an application programming interface and a linking module, obtain a plurality of oilfield modules, each of the plurality of oilfield modules adapted to perform at least one oilfield task of a second oilfield application, selectively load the plurality of oilfield modules into the application shell to form the second oilfield application, selectively encapsulate at least one of the plurality of the oilfield modules for compatibility with the application shell, selectively integrate the plurality of oilfield modules into a format for operability with the application shell, and cooperatively perform the at least one oilfield task based on the first oilfield application and the second oilfield application.

Other aspects and advantages of the invention will be apparent from the following description and the appended claims.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 2A depicts the wellsite having drilling equipment for performing drilling operations. FIG. 2B depicts an exemplary wellsite having production equipment linked to a gathering network and a process facility for performing production and/or simulation operations.

DETAILED DESCRIPTION

Figure 1:
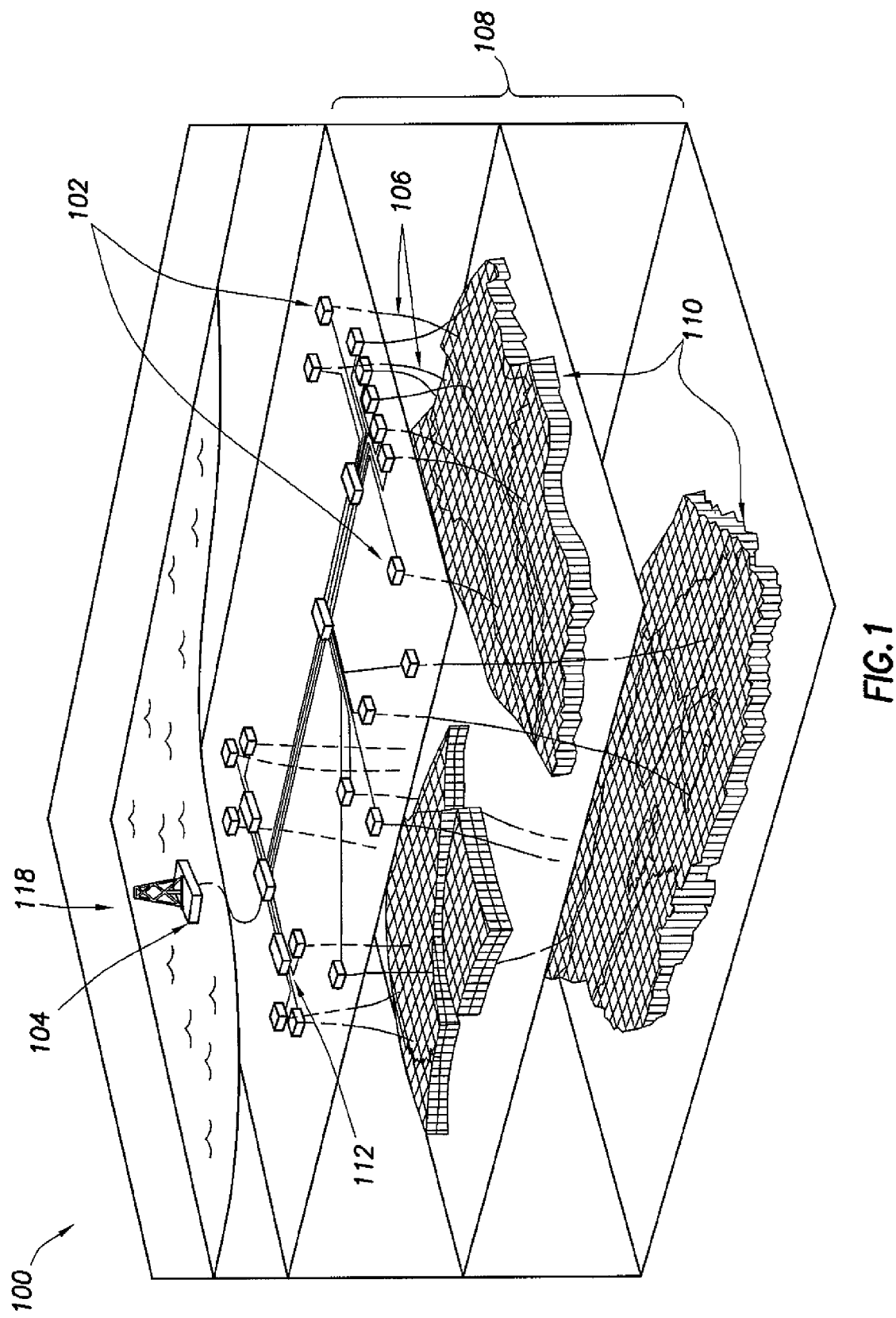
FIG. 1 is a schematic view, partially in cross-section of an oilfield having process facilities, gathering network and a plurality of wellsites.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

FIG. 1 illustrates an exemplary oilfield (100) that may be used in connection with the present invention. The oilfield (100) is used to locate and gather valuable hydrocarbons. Various oilfield operations are performed throughout the oilfield to gather these hydrocarbons. As will be described below, such oilfield operations may include, for example, drilling, evaluating, completing, monitoring, producing, simulating, reporting, etc. Individual oilfield tasks, such as reservoir simulations, well planning and other tasks, may be performed as part of such oilfield operations to achieve, or assist in achieving, one or more oilfield operations.

As shown, the oilfield has a plurality of wellsites (102) operatively connected to a central processing facility (104). The oilfield configuration of FIG. 1 is not intended to limit the scope of the invention. Part, or all, of the oilfield may be on land and/or sea. Also, while a single oilfield with a single processing facility and a plurality of wellsites is depicted, the present invention may be utilized with any combination of one or more oilfields, one or more processing facilities and one or more wellsites. In some cases, the oilfield operations may occur prior to the addition of wellsites, for example during seismic surveying.

Each wellsite (102) has equipment that forms a wellbore (106) in the earth. The wellbores extend through subterranean formations (108) containing reservoirs (110). These reservoirs contain fluids, such as hydrocarbons. The wellsites draw fluid from the reservoirs and pass them to the processing facilities via gathering networks (112). The gathering networks have tubing and control mechanisms for controlling the flow of fluids from the wellsite to the processing facility 104.

FIG. 2 illustrates a wellsite system (200) with which the present invention can be utilized to advantage. The wellsite system (200) includes a drilling system (202) and a surface unit (204). In the illustrated embodiment, a borehole (206) is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs.

The drilling system (202) includes a drill string (208) suspended within the borehole (206) with a drill bit (210) at its lower end. The drilling system (202) also includes the land-based platform and derrick assembly (212) positioned over the borehole (206) penetrating a subsurface formation F. The assembly (212) includes a rotary table (214), kelly (216), hook (218) and rotary swivel (219). The drill string (208) is rotated by the rotary table (214), energized by means not shown, which engages the kelly (216) at the upper end of the drill string. The drill string 208 is suspended from hook (218), attached to a traveling block (also not shown), through the kelly (216) and a rotary swivel (219) which permits rotation of the drill string relative to the hook.

The surface system further includes drilling fluid or mud (220) stored in a pit (222) formed at the well site. A pump (224) delivers the drilling fluid (220) to the interior of the drill string (208) via a port in the swivel (219), inducing the drilling fluid to flow downwardly through the drill string (208) as indicated by the directional arrow (224). The drilling fluid exits the drill string (208) via ports in the drill bit (210), and then circulates upwardly through the region between the outside of the drill string and the wall of the borehole, called the annulus, as indicated by the directional arrows (226). In this manner, the drilling fluid lubricates the drill bit (210) and carries formation cuttings up to the surface as it is returned to the pit (222) for recirculation.

The drill string (208) further includes a bottom hole assembly (BHA), generally referred to as (230), near the drill bit (210) (in other words, within several drill collar lengths from the drill bit). The bottom hole assembly includes capabilities for measuring, processing, and storing information, as well as communicating with the surface unit. The BHA (208) further includes drill collars (228) for performing various other measurement functions.

Sensors S are located about the wellsite to collect data, preferably in real time, concerning the operation of the wellsite, as well as conditions at the wellsite. For example, monitors, such as cameras (not shown), may be provided to provide pictures of the operation. Surface sensors or gauges S are deployed about the surface systems to provide information about the surface unit, such as standpipe pressure, hookload, depth, surface torque, rotary rpm, among others. Downhole sensors or gauges S are disposed about the drilling tool and/or wellbore to provide information about downhole conditions, such as wellbore pressure, weight on bit, torque on bit, direction, inclination, collar rpm, tool temperature, annular temperature and toolface, among others. The information collected by the sensors and cameras is conveyed to the surface system, the downhole system and/or the surface control unit.

The drilling system (202) is operatively connected to the surface unit (204) for communication therewith. The BHA is provided with a communication subassembly (252) that communicates with the surface unit. The communication subassembly (252) is adapted to send signals to and receive signals from the surface using mud pulse telemetry. The communication subassembly may include, for example, a transmitter that generates a signal, such as an acoustic or electromagnetic signal, which is representative of the measured drilling parameters. Communication between the downhole and surface systems is depicted as being mud pulse telemetry, such as the one described in U.S. Pat. No. 5,517,464, assigned to the assignee of the present invention. It will be appreciated by one of skill in the art that a variety of telemetry systems may be employed, such as wired drill pipe, electromagnetic or other known telemetry systems.

Figure 2A:
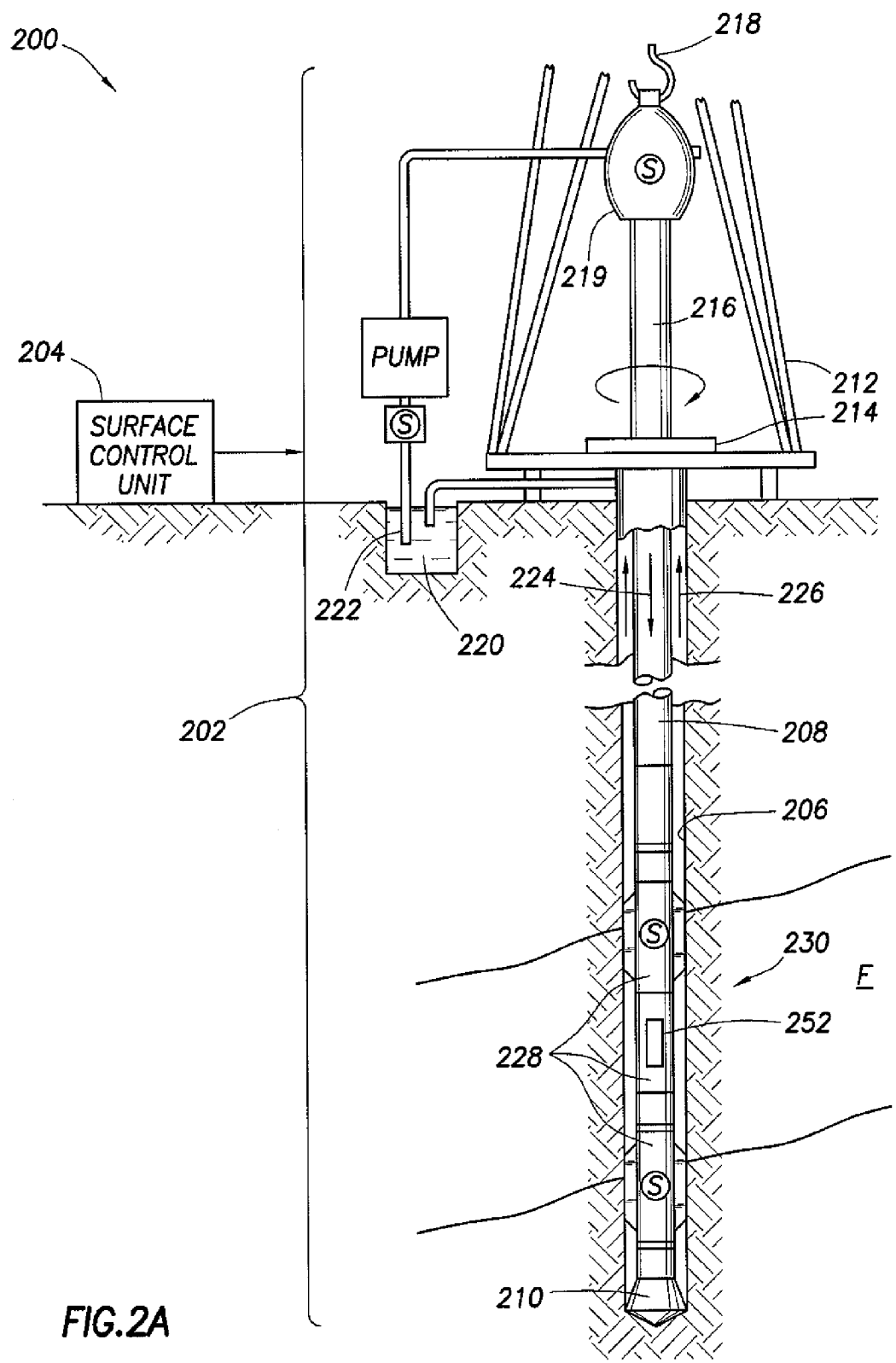
FIGS. 2A and 2B are a schematic views of a portion of the oilfield of FIG. 1 depicting an exemplary wellsite in detail.
Figure 2B:
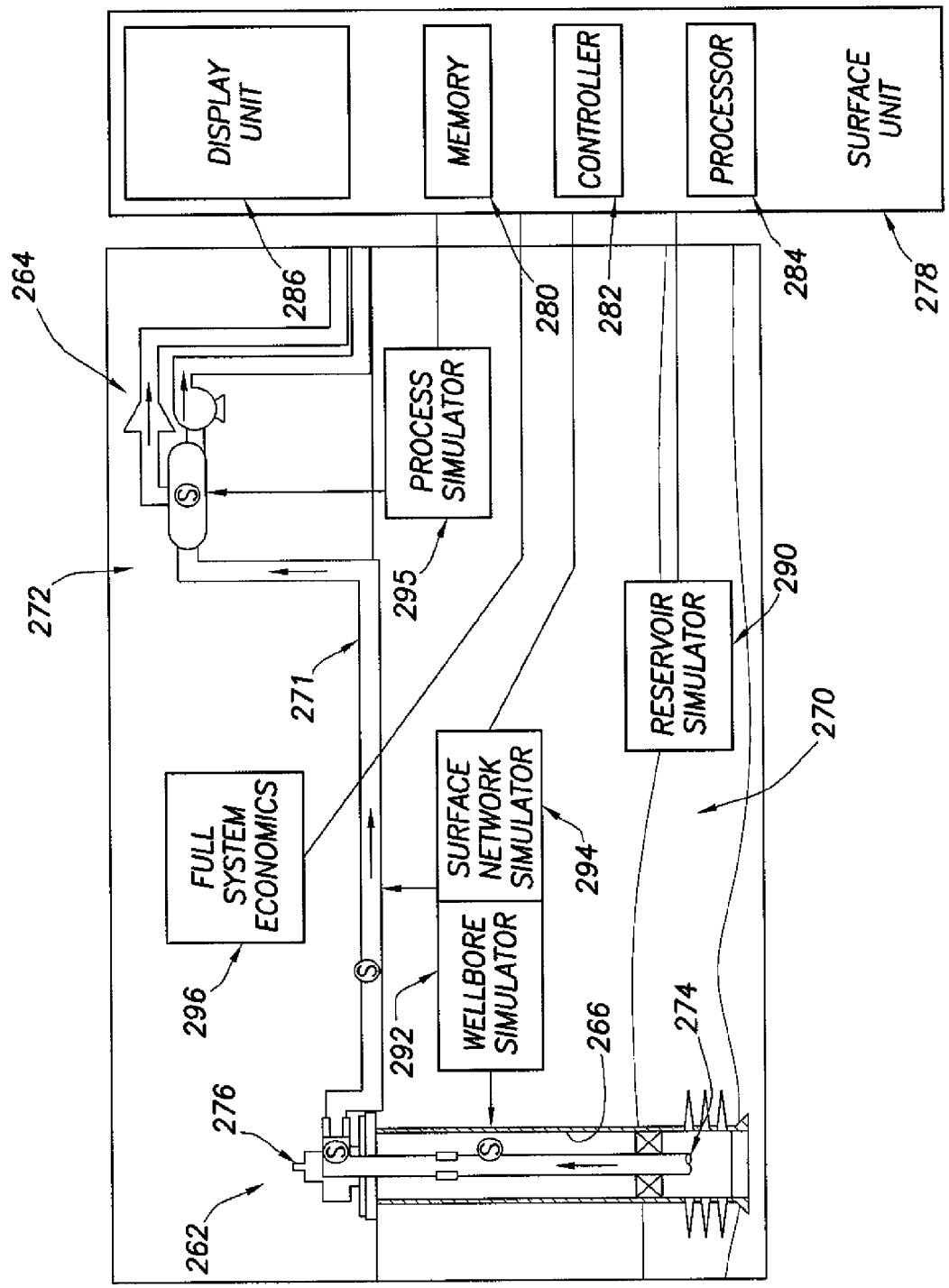

FIG. 2B shows a schematic view of a portion of the oilfield (100) of FIG. 1, depicting wellsite (262) and gathering network (272) in detail. The wellsite (262) of FIG. 2 has a wellbore (266) extending into the earth therebelow. As shown, the wellbore (266) has already been drilled, completed and prepared for production from reservoir (270). Wellbore production equipment (274) extends from a wellhead (276) of wellsite (262) and to the reservoir to draw fluid to the surface. The wellsite (262) is operatively connected to the gathering network (272) via transport line (271). Fluid flows from the reservoir (270), through the wellbore (266), and onto the gathering network (272). The fluid then flows from the gathering network (272) and to the process facilities (264).

As further shown in FIG. 2, sensors S are located about the oilfield to monitor various parameters during oilfield operations. The sensors may measure, for example, pressure, temperature, flow rate, composition and other parameters of the reservoir, wellbore, gathering network, process facilities and other portions of the oilfield operation(s). These sensors are operatively connected to a surface unit (278) for collecting data therefrom.

One or more surface units may be located at the oilfield, or linked remotely thereto. The surface unit (278) may be the same surface unit (204) used in FIG. 2A. The surface unit may be a single unit, or a complex network of units used to perform the necessary data management functions throughout the oilfield. The surface unit may be a manual or automatic system. The surface unit may be operated and/or adjusted by a user. The surface unit is adapted to receive and store data. The surface unit may also be equipped to communicate with various oilfield equipment. The surface unit may then send command signals to the oilfield in response to data received.

The surface unit (278) has computer facilities, such as memory (280), controller (282), processor (284) and display unit (286), for managing the data. The data is collected in memory, and processed by the processor for analysis. Data may be collected from the oilfield sensors and/or by other sources. For example, oilfield data may be supplemented by historical data collected from other operations, or user inputs.

The analyzed data may then be used to make decisions. A transceiver may be provided to allow communications between the surface unit and the oilfield. The controller may be used to actuate mechanisms at the oilfield via the transceiver and based on these decisions. In this manner, the oilfield may be selectively adjusted based on the data collected. These adjustments may be made automatically based on computer protocol and/or manually by an operator. In some cases, well plans will be adjusted to select optimum operating conditions, or to avoid problems.

To facilitate the processing and analysis of data, simulators are typically used by the processor to process the data. Specific simulators are often used in connection with specific oilfield operations, such as reservoir or wellbore production. Data fed into the simulator(s) may be historical data, real time data or combinations thereof. Simulation through one or more of the simulators may be repeated or adjusted based on the data received.

As shown, the oilfield is provided with wellsite and non-wellsite simulators. The wellsite simulators include a reservoir simulator (290), a wellbore simulator (292) and a surface simulator (294). The reservoir simulator solves for petroleum flow through the reservoir rock and into the wellbores. The wellbore and surface network simulator solves for petroleum flow through the wellbore and the surface gathering network of pipelines. As shown, some of the simulators may be separate or combined, depending on the available systems.

The non-wellsite simulators include process and economics simulators. The processing unit has a process simulator (295). The process simulator models the processing plant where the petroleum is separated into its constituent components (methane, ethane, propane, etc.) and prepared for sales. The oilfield is provided with an economics simulator (296). The economics simulator models the costs of part, or all, of the oilfield. Various combinations of these and other oilfield simulators may be provided.

Figure 3A:
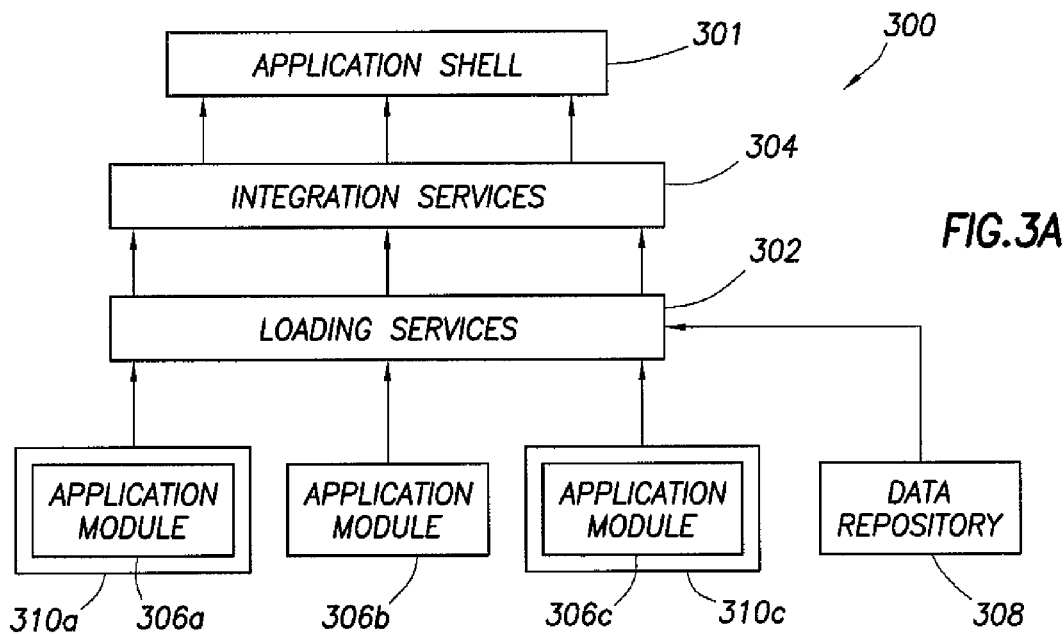
FIG. 3A is a schematic view of an oilfield application for performing oilfield operations, the oilfield application having an application shell, application modules and services therebetween.

FIG. 3A shows a schematic view of an oilfield application (300) usable with the oilfield operation of, for example, those depicted in FIGS. 1, 2A and 2B. The oilfield application (300) may be used with different phases of the oilfield operation, for example, during the development phase prior to drilling, during the drilling phase, during the production phase, etc. The oilfield application includes an application shell (301), loading services (302), integration services (304) and application modules (306a), (306b), and (306c). A data repository (308) is also preferably provided.

The application shell (300) is the basic structure for building an interface for forming an oilfield application. It may utilize a platform for creating an application. This platform provides basic building blocks for assembling the oilfield application. Additional functionality is typically provided to provision the platform so the application shell has capabilities for performing oilfield operations. For example, the platform may be system software capable to provide functionality for creating complex applications made of loosely coupled components, such that simple components may be combined to provide complex capabilities. The platform may allow these components to be independently developed, tested, and deployed. One such exemplary platform is Microsoft's® Composite User Interface Application Block (CAB), which is capable of creating complex user interfaces in a composite pattern. In another example, the platform may have the functionality to provide a consistent programming model for building applications while providing a separation between application functions, such as the user interface and the business logic. The platform may unify a host of application services for user interface (UI) and display function including but not limited to any of the following: UI button, UI menu, UI form, form filling paradigm, advanced selector, think ahead help, hierarchical data display, transparent layers, adaptive zooming paradigm, wireframe, storyboard, interactions to facilitate display on large or small devices, colorized composition, multiple data types for display, support for display component library, 2D and 3D drawing, fixed and adaptive documents, advanced typography, vector graphics, raster graphics, animation, data binding, audio, video, or any combinations thereof. More details of these application services are described later. One such exemplary platform is Microsoft's® Windows Presentation Foundation (WPF).

The application shell may be provided in a pre-defined format. The application shell, or at least a portion, may also be generated from a provided tool-kit. Furthermore, the application shell provider, the application module provider, and the oilfield application provider may be the same entity or different entities.

The application shell may also be provided with constraints, requirements or other features, such as data, that assist in defining the oilfield application for performing the oilfield operation. For example, the application shell may provide user interface interaction and display services to the application modules to facilitate display on a variety of devices. The application shell is adapted to receive the loaded and integrated application modules to form the oilfield application.

The application modules (306a), (306b), and (306c) contain various oilfield sub-applications or tasks to be performed by the oilfield application. These application modules may be tools for performing tasks, such as generating reports, generating well plans, performing simulations, performing production operations, performing seismic operations, performing completions operations, performing drilling operations, etc. Some of these modules may be general modules with standard format and provide general functions reusable by different applications. These application modules may also be pre-existing sub-applications or applications created specifically for the oilfield applications.

The application modules are to be loaded and integrated into the application shell. The application shell hosts the application modules by, for example, loading, starting and/or providing services that the modules need to operate. For example, the application shell hosts application modules that may provide user interfaces, such as buttons, menus or other features, that permit the user to activate functionality of the oilfield application or the application modules. In this manner, the application shell may selectively perform one or more of the tasks by selectively activating the various application modules. The application modules may be activated simultaneously, sequentially and combinations thereof to provide the desired functions in the desired time frame(s) or sequence(s).

In addition to the user interface buttons and menus, the application shell may also provide other features for use by the application modules to perform tasks for the oilfield operation. The features may include, but not limited to any of the following or any combinations thereof.

1. Form filling paradigm, i.e., the functions to reduce typing needed for filing out data entry forms, e.g., an auto-completion function.

2. Advanced selector, which is an element of the form filling paradigm, whereby the system uses the type of data to represent an alternative to typing in an answer. For example, the next logical depths for a trajectory in a well design on a graph/chart.

3. Think ahead help, which provides the help screen based on application context.

4. Hierarchical data display for presenting parent and child relational elements, e.g., a data tree, table tree, etc.

5. Transparent layers, which are user interface elements displayed in an overlapping format with transparent upper layers allowing the deeper layers to be visible. The opacity or transparency of upper layers may be adjusted for improved data presentation.

6. Adaptive zooming paradigm for determining the size and shape of the display elements to accommodate the data context being represented. For example, in a small display device, one element may be zoomed in and others may be zoomed out while maintaining a scale that is still legible for the context.

7. Wireframe, which is a straw man or low fidelity illustration of a user interface design.

8. Storyboard, which is a set of illustrations describing the user interface design and interactions to achieve a certain goal 9. Colorized composition, which is a high fidelity illustration of the user interface design to show the effect of the graphical design and interaction design.

To make the application modules available for use through the oilfield application, the modules are selectively loaded and/or integrated together either in a pre-determined format or dynamically as determined by the application modules or as directed, explicitly or implicitly, by the user as defined by the application shell. In some cases, the application modules may not be compatible with the application shell. Each such application module (306) may, therefore, need to be adapted for integration within the shell. Some such application modules may need an adapter for compatibility with the shell. As shown in FIG. 3A, application modules (306a) and (306c) are encapsulated within an adapter (310a) and (310c), respectively, that presents an interface compatible with the application shell (301) and enables the shell to operate the application modules (306a,c). The adapters (310a) and (310c) may be the same, or defined differently depending on the needs of the application modules they encapsulate.

The application module is capable of performing certain functions in a predefined manner. In order to perform these functions via the application shell, the application module may be provided with the adapter so that it may conform to the requirements or expectations of the application shell. The application module is provided with certain functionality that will enable the application module to adapt to the shell. In other words, the expectations of the shell are translated into those provided by the application module. An adapter is provided to encapsulate the application modules. This adapter has an interface compatible with the shell and the application module to enable interoperability therebetween.

The adapter may be any interface capable of operatively linking the application modules with the application shell. Preferably, the adapter is provided with capabilities for selectively controlling the interaction between the application module and the application shell.

While the application modules are depicted as being separate application modules operatively linked to the shell via the integration and loading services, it will be appreciated that the application modules may be operatively linked prior to linking with the application shell. This may be done, for example, by interfacing the application modules prior to attachment. Some application modules may be separately designed for interaction and/or provided with the necessary interaction using the services as depicted.

The loading services (302) are used to load the application module(s) into the application shell. The loading services may initialize, or activate, the application module in preparation for integration with one another and/or with the application shell. For example, in some cases, an un-initialized application module may not function in the shell. The application modules may need to be activated prior to integration in order to function properly. Depending on the functionality of the tasks, some application modules may require initialization. The loading services may also be used to establish any necessary connections with a data repository (e.g., a database) needed to perform the task identified by the application module.

The application module(s) may then be integrated with the application shell so that they may be controlled by the application user. Integration as used herein refers to the application modules discovery of the existence of other application modules and/or the provisioning of the integrated shell with interface elements for operation of the application modules. The discovery of the existence of the application modules involves querying for the existence of application modules. For example, a query may search for the application modules by name or function. The combined capabilities of the integrated application modules are greater than the sum of the capabilities of the application modules taken individually. A feature of integration services is the ability for one application module to discover another application module by name. Once the application modules know about each other, the individual application modules may leverage off of the functionality of other application modules. The interaction between the application modules enables the application modules to share data, perform simultaneous or consecutive function and generate synergistic results. The combined functionality of the application modules may be used to provide optimized oilfield operations.

The provisioning of the integrated shell with interface elements for operation of the application modules involves adding interface elements, such as menus, buttons or other user interface items, for controlling the operation of the application modules. The application modules may then be selectively activated using these controls. These elements may also provide display features to textual and/or graphical displays of measurements, predictions, plans, operating parameters or other features of the oilfield. Examples of user interface and display features provided from the application shell for use by the application modules may include form filling paradigm, advanced selector, think ahead help, hierarchical data display, transparent layers, adaptive zooming paradigm, wireframe, storyboard, interactions to facilitate display on large or small devices, colorized composition, multiple data types for display, support for display component library, 2D and 3D drawing, fixed and adaptive documents, advanced typography, vector graphics, raster graphics, animation, data binding, audio, video, or any combinations thereof.

After integrating the application modules together, the application modules can integrate themselves with the application shell. This typically means that the application modules create user interface elements that allow a user of the application to operate the application modules. The user interface elements may include, for example, buttons, menu items and other displays.

The integration services (304) make the initialized application modules available to the application shell. The system may be automatic or manual. In cases, where user input is involved, an application module may provide user interface elements to activate capabilities of the application modules. The application modules are preferably formatted to operate within the application shell. Thus, once implemented within the application shell, the application modules are capable of performing their respective functions.

The application modules may be statically or dynamically loaded (and sometimes unloaded). In some cases, a first set of application modules may be loaded initially, and additional application modules loaded at a later time to increase functionality. Once the application modules are incorporated into the application shell according to the requirements, an oilfield application is formed. The oilfield application is configured to perform the tasks or functions defined by the oilfield application modules. These tasks may be performed automatically or manually to complete the required oilfield operations. One or more application shells may be used to form the oilfield application. One or more application modules may be used to complete tasks for performing one or more oilfield operation (s). Examples of the tasks performed by the application modules may include business logic function such as generating reports, generating well plans, performing simulations, performing production operations, performing seismic operations, performing completions operations, and performing drilling operations.

It will be appreciated that there may be an interface between the application shell (300) and the integration services (304) or the loading services (302) that may be integrated in the integration services (304) or the loading services (302) or as a separate interface block (not shown). This interface and its implementation allow the integration services (304) and/or the loading services (302) to work with different application shell (300), such as a predefined application shell, an application shell generated from a tool-kit, or an application shell provided by a different entity than the provider of the application modules (e.g., any of the application modules (306a), (306b), or (306c)).

Data may also be used during the oilfield application process. In some cases, the application shell is provided with access to a data repository (308) (e.g., a database). In other cases, data is drawn in via the application modules. A connection to the data source (e.g., a database connection) may be needed to selectively draw data into the oilfield application. The data may then be drawn into the oilfield application via the application modules, services and/or shell as desired. The data repository (308) or the data source may be integrated or have more than one storage component, local or remote, connected directly or through a network, or configured in other appropriate configurations.

Based on the displayed information, it may be desired to change various aspects of the oilfield operation and/or the oilfield application. For example, the results provided may indicate that a change at the oilfield is necessary or advantageous. The oilfield application may also be adjusted, for example, by selecting different application modules and/or by changing the selective operation of the existing application modules.

Figure 3B:
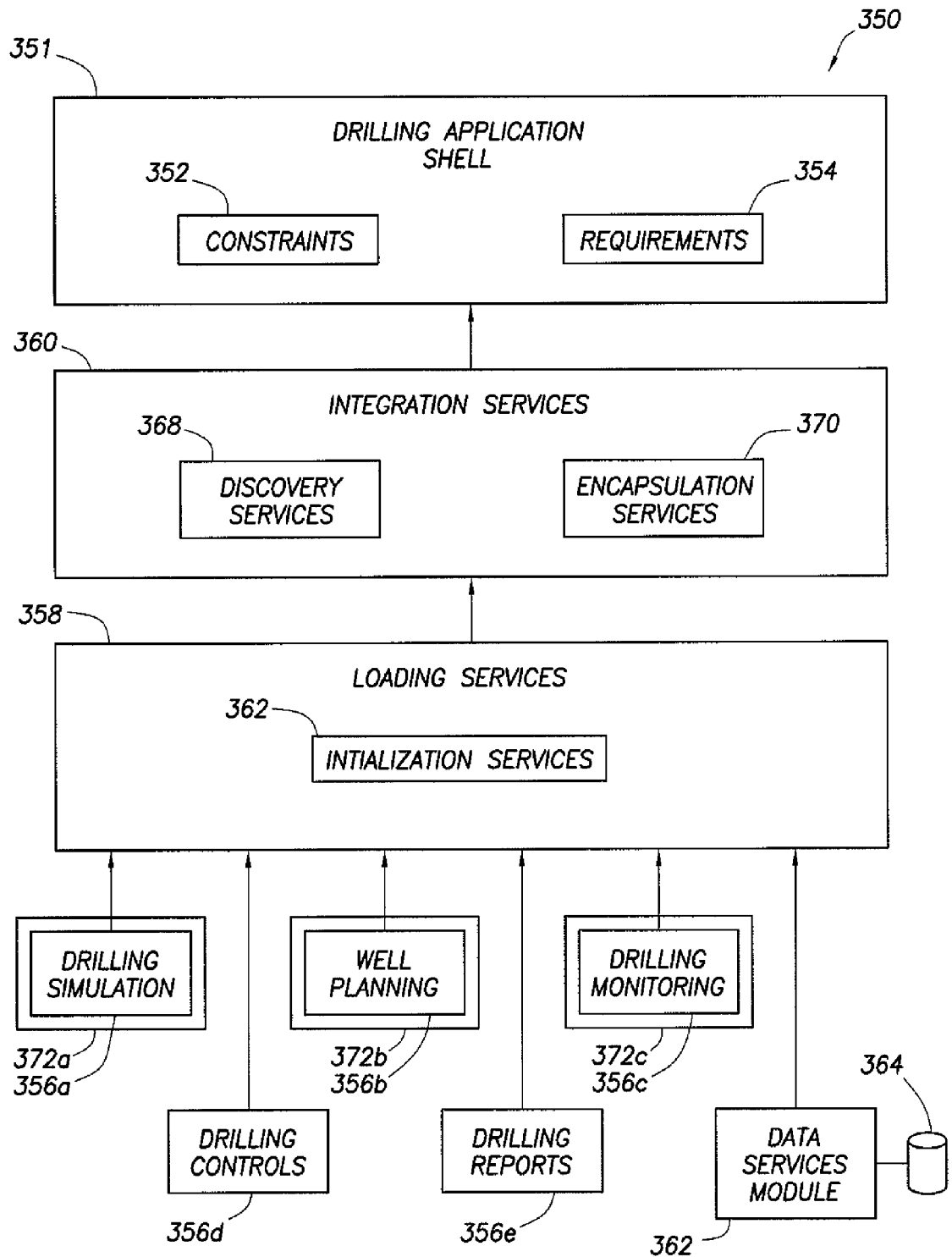
FIG. 3B is a schematic view of the oilfield application of FIG. 3A used to perform a drilling operation.

FIG. 3B is a schematic example of an oilfield application (350) for performing drilling oilfield operations. In this case, the drilling application shell is provided with factors, such as constraints (352) and requirements (354). The constraints (352) determine the requirements for performing the oilfield operations. For example, drilling operations may require certain operating parameters, such as weight on bit, torque on bit, mud pressure and wellbore pressure. These constraints define the limitations that the application and its underlying application modules or sub-applications will perform. In this manner, the application may be restricted from permitting the wellbore to perform at unsafe or inefficient levels.

The requirements (354) relate to the operating format for the application. The application may be defined to incorporate and/or process the various drilling application modules (356a), (356b), (356c), (356d), (356e) in a specific manner. These drilling modules are loaded using the loading services (358), and integrated using the integration services (360.

For example, the well planning module (356b) may be formatted to perform first, and provide outputs to the drilling controls module (356d). In another example, the drilling monitoring module (356c) may be formatted to send data to the drilling simulation module (356a) to update well plans generated thereby. Reports may be generated by (356e) throughout the process. The sequence of events performed by the application is defined by the requirements. The requirements may further provide for selective activation, data sharing, and interaction of the various application modules.

The various drilling modules are depicted as being drilling simulation (356a), well planning (356b), drilling monitoring (356c), drilling controls (356d), and drilling reports (356e). These application modules may be in the form of pre-existing applications capable of performing various oilfield tasks. One or more of these drilling modules may be used to perform one or more oilfield operations during drilling. If desired, one or more of these application modules may be combined with other application modules to perform additional oilfield operations in a single application. For example, it may be desirable to perform economics simulation during the drilling operation to determine costs associated therewith. An economics simulation module may, therefore, also be included in the defined oilfield application.

The loading services (358) may be the same as the loading services (302) of FIG. 3A. As shown, the loading services (358) are provided with various loading sub-services, such initialization services (362). These initialization services are used to initialize the sub-module in preparation for operation with the application shell. Other loading sub-services may also be provided.

The integration services (360) may be the same as the integration services (304) of FIG. 3A. As shown, the integration services (360) are provided with discovery subservices (368) and encapsulation subservices (370). Discovery subservice (368) is a service used to permit application modules to discover each other and cooperate. In some cases, the interface of the individual application modules must be adapted to comply with the drilling application shell. The encapsulating subservice provides an interface to allow the application modules to operate the application shell. A shown, application modules (356a), (356b), (356c) are encapsulated with adapters (372a), (372b), (372c), respectively.

The drilling application generated from the application shell and integrated application modules are used to perform the requested drilling oilfield operations. Once assembled, the drilling application may be used to selectively perform a group of individual drilling tasks, such as simulating drilling operations, developing a well plan, monitoring drilling operations, adjusting drilling operations, and generating drilling reports.

If desired data services module (362) can be provided. Data services may be provided by an application module capable of interacting with a data repository (364), such as a database or other persistent store. For an application module to use data services, the data service module may be discovered during the integration process.

Figure 3C:
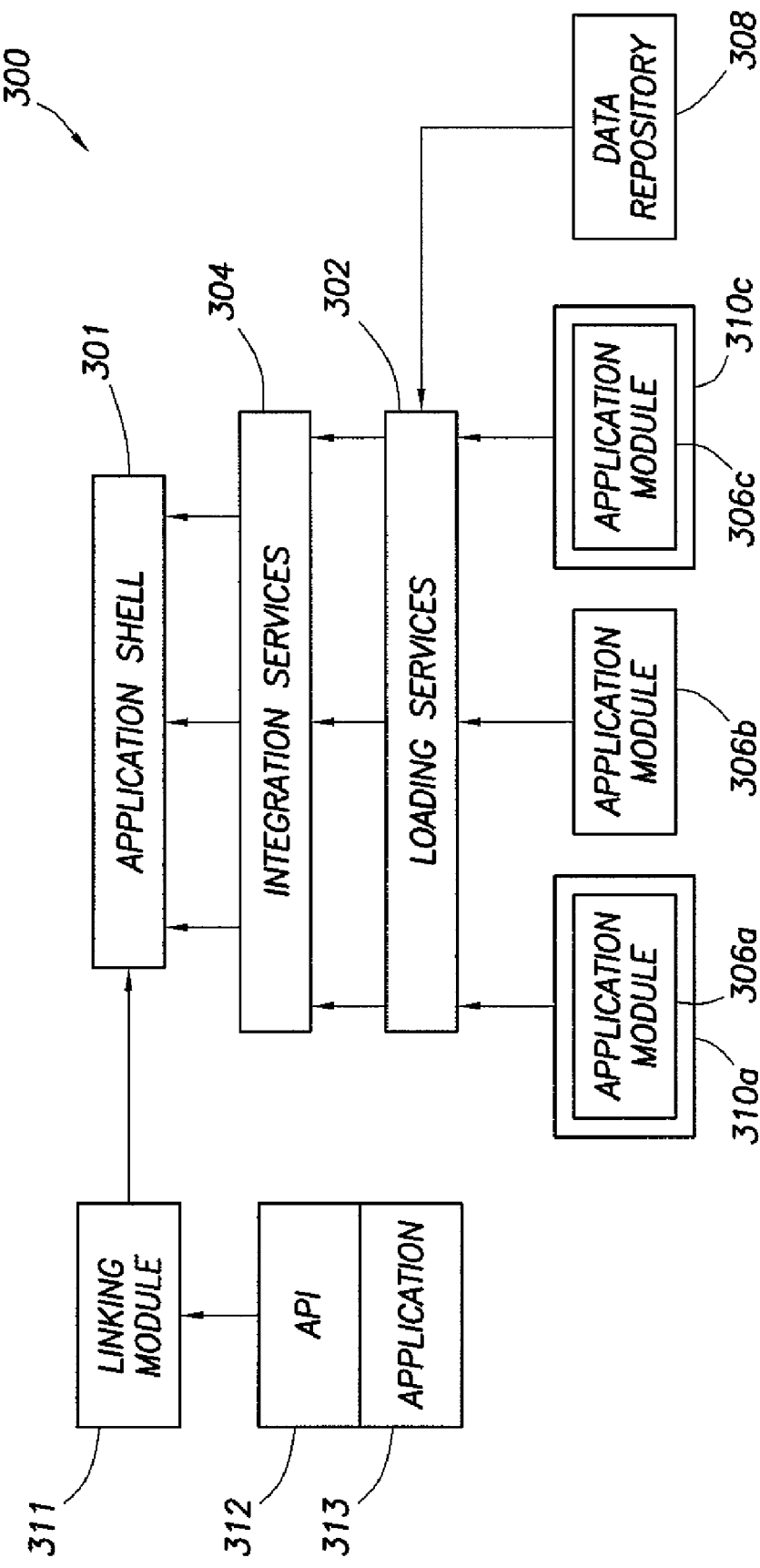
FIG. 3C is a schematic view of the oilfield application of FIG. 3A linking with another application.

FIG. 3C is a schematic view of the oilfield application of FIG. 3A linking with another application. In addition to the application shell (301), loading services (302), integration services (304), application modules (306a), (306b), (306c), an data repository (308) described above, the application shell (301) is further coupled to a linking module (311), which is in turned coupled to the application (313) via an application programming interface (API) (312). In this configuration, the functionalities provided by the application modules may be selectively activated for use within the application (313) in the desired time frame(s) or sequence(s). One or more application shells may be operatively coupled to the application (313). One or more application modules may be used to complete tasks for performing the desired functionalities within the application (313).

Figure 4:
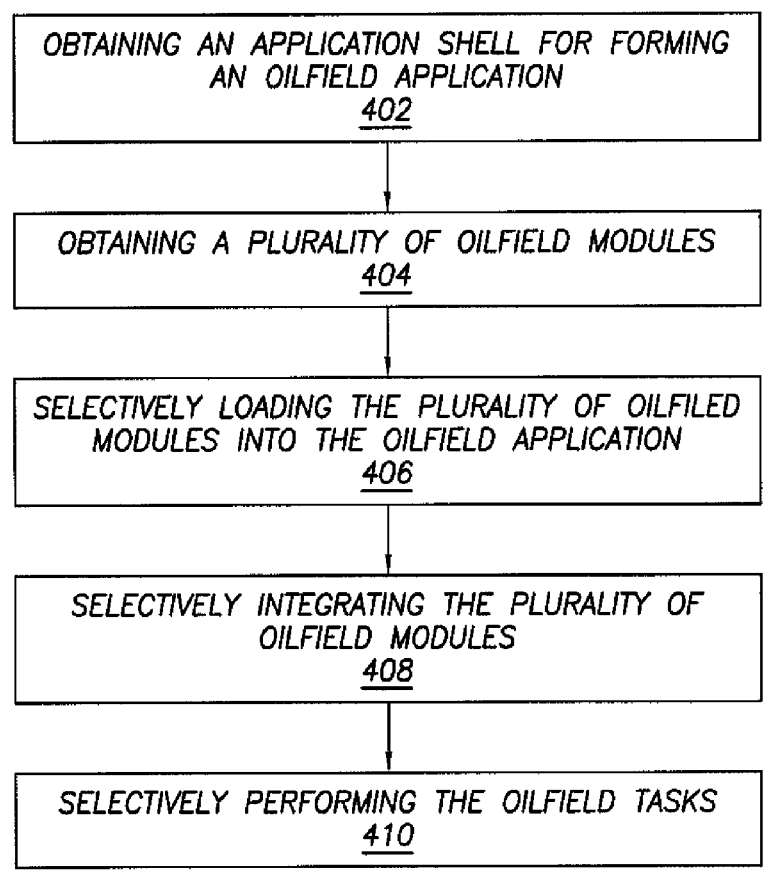
FIG. 4 is a flowchart depicting a method of performing an oilfield operation involving creating an oilfield application.

A method (400) of performing an oilfield operation is depicted in FIG. 4. This method operation may be performed using an oilfield application, such as the ones depicted in FIGS. 3A and/or 3B. This method may be tailored to the specific type of oilfield application, such as the drilling application of FIG. 3B.

The oilfield application shell is created (402) to meet the needs of the oilfield operation(s). The application shell may be created as previously described with respect to the application shell (301) of FIG. 3A. Thus, the application shell may be provided with requirements, constraints, data and additional functionality as desired.

A plurality of oilfield application modules is obtained (404). These application modules may be created or pre-existing oilfield application modules as previously described with respect to the application modules (306a), (306b), and (306c) of FIG. 3A. Each of the oilfield application modules is adapted to perform at least one oilfield task of the oilfield application.

The oilfield application modules are selectively integrated into the oilfield application shell (408). The oilfield application modules are formatted in a manner that permits them to operate properly via the oilfield application. Once loaded and integrated, the oilfield application is formed. The oilfield application may then be used to selectively perform the oilfield tasks (410) of the oilfield operation(s). Additional steps, such as obtaining data may also be performed.

It will be understood from the foregoing description that various modifications and changes may be made in the preferred and alternative embodiments of the present invention without departing from its true spirit. For example, steps of the method may be performed sequentially, simultaneously, or repeatedly.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically

What is claimed is:

1. A system for performing an oilfield operation of an oilfield having a subterranean formation for extracting fluid from an underground reservoir therein, comprising:
    a surface unit comprising a processor and memory storing instructions;
    a plurality of oilfield application modules executing on the processor of the surface unit, each of the plurality of oilfield application modules performing at least one oilfield task of the oilfield operation;
    an application shell for defining an oilfield application, the application shell adapted to define the oilfield application using the plurality of oilfield application modules,
        wherein the application shell comprises a constraint and a requirement,
        wherein the constraint specifies a restriction of the plurality of oilfield application modules restricting operation of a drilling equipment according to an operating parameter, and
        wherein the requirement specifies a sequence of events for the at least one oilfield task performed by each of the plurality of oilfield application modules;
    an adapter for encapsulating at least one of the plurality of oilfield application modules for compatibility with the application shell;
    loading services for loading the plurality of oilfield application modules into the application shell, the loading services initializing the plurality of oilfield application modules; and
    integration services for integrating the plurality of oilfield application modules into the application shell, the integrating services integrating the plurality of oilfield application modules for operability with the application shell whereby the at least one oilfield task of the oilfield operation is enabled,
    wherein the oilfield application is adapted to:
        perform, according to the sequence of events specified by the requirement, well planning using a well planning module of the plurality of oilfield modules to provide a well plan to a drilling controls module of the plurality of oilfield modules;
        monitor, according to the sequence of events specified by the requirement, drilling of a wellbore using a drilling monitoring module of the plurality of oilfield modules to send drilling data to a drilling simulation module of the plurality of oilfield modules;
        perform a simulation using the drilling simulation module to update the well plan based on the drilling data; and
        monitor the operating parameter to prevent, during the drilling of the wellbore, the wellbore from performing at a level restricted based on the constraint.

2. The system of claim 1, further comprising a data repository operatively coupled to the application shell.

3. The system of claim 1, wherein at least a portion of the plurality of oilfield application modules is provided by a different entity than the provider of the application shell.

4. The system of claim 1, wherein at least a portion of the application shell is automatically generated from a tool-kit.

5. The system of claim 1, wherein at least one of the oilfield application modules provides at least one selected from a group consisting of user interface function, display function, and business logic function based on the application shell.

6. The system of claim 5, wherein the user interface (UI) function comprises at least one selected from a group consisting of UI button, UI menu, UI form, form filling paradigm, advanced selector, and think ahead help.

7. The system of claim 5, wherein the display function comprises at least one selected from a group consisting of hierarchical data display, transparent layers, adaptive zooming paradigm, wireframe, storyboard, interactions to facilitate display on large or small devices, colorized composition, multiple data types for display, support for display component library, 2D and 3D drawing, fixed and adaptive documents, advanced typography, vector graphics, raster graphics, animation, data binding, audio, and video.

8. The system of claim 5, wherein the business logic function comprises at least one selected from a group consisting of generating reports, generating well plans, performing simulations, performing production operations, performing seismic operations, performing completions operations, and performing drilling operations.

9. A method for performing an oilfield operation of an oilfield having a subterranean formation for extracting fluid from an underground reservoir therein, the method comprising:
    obtaining an application shell for forming a first oilfield application;
    obtaining a plurality of oilfield modules, each of the plurality of oilfield modules adapted to perform at least one oilfield task of the first oilfield application,
        wherein the application shell comprises a constraint and a requirement,
        wherein the constraint specifies a restriction of the plurality of oilfield application modules restricting operation of a drilling equipment according to an operating parameter, and
        wherein the requirement specifies a sequence of events for the at least one oilfield task performed by each of the plurality of oilfield application modules;
    loading, using a processor of a surface unit, the plurality of oilfield modules into the application shell to form the first oilfield application;
    encapsulating, using the processor, at least one of the plurality of the oilfield modules for compatibility with the application shell;
    integrating, using the processor, the plurality of oilfield modules into a format for operability with the application shell;
    performing, according to the sequence of events specified by the requirement, well planning using a well planning module of the plurality of oilfield modules to provide a well plan to a drilling controls module of the plurality of oilfield modules;

monitoring, according to the sequence of events specified by the requirement, drilling of a wellbore using a drilling monitoring module of the plurality of oilfield modules to send drilling data to a drilling simulation module of the plurality of oilfield modules;

performing a simulation using the drilling simulation module to update the well plan based on the drilling data; and monitoring the operating parameter to prevent, during the drilling of the wellbore, the wellbore from performing at a level restricted based on the constraint.

10. The method of claim 9, further comprising:
inputting data into the first oilfield application from a data repository.

11. The method of claim 9, further comprising:
coupling a second oilfield application to the application shell via an application programming interface and a linking module,
wherein the at least one oilfield task is performed cooperatively based on the first oilfield application and the second oilfield application.

12. The method of claim 9, wherein at least a portion of the application shell is automatically generated from a tool-kit.

13. The method of claim 9, wherein at least one of the oilfield application modules provides at least one selected from a group consisting of user interface function, display function, and business logic function based on the application shell.

14. The method of claim 13, wherein the user interface (UI) function comprises at least one selected from a group consisting of UI button, UI menu, UI form, form filling paradigm, advanced selector, and think ahead help.

15. The method of claim 13, wherein the display function comprises at least one selected from a group consisting of hierarchical data display, transparent layers, adaptive zooming paradigm, wireframe, storyboard, interactions to facilitate display on large or small devices, colorized composition, multiple data types for display, support for display component library, 2D and 3D drawing, fixed and adaptive documents, advanced typography, vector graphics, raster graphics, animation, data binding, audio, and video.

16. The method of claim 13, wherein the business logic function comprises at least one selected from a group consisting of generating reports, generating well plans, performing simulations, performing production operations, performing seismic operations, performing completions operations, and performing drilling operations.

17. A method for performing an oilfield operation of an oilfield having a subterranean formation for extracting fluid from an underground reservoir therein, the method comprising:
coupling a first oilfield application to an application shell via an application programming interface and a linking module,
wherein the application shell comprises a constraint and a requirement,
wherein the constraint specifies a restriction of the plurality of oilfield application modules restricting operation of a drilling equipment according to an operating parameter, and
wherein the requirement specifies a sequence of events for the at least one oilfield task performed by each of the plurality of oilfield application modules;

obtaining a plurality of oilfield modules, each of the plurality of oilfield modules adapted to perform at least one oilfield task of a second oilfield application;

loading, using a processor of a surface unit, the plurality of oilfield modules into the application shell to form the second oilfield application;

encapsulating, using the processor, at least one of the plurality of the oilfield modules for compatibility with the application shell;

integrating, using the processor, the plurality of oilfield modules into a format for operability with the application shell; and cooperatively performing the at least one oilfield task based on the first oilfield application and the second oilfield application by:

performing, according to the sequence of events specified by the requirement, well planning using a well planning module of the first oilfield application to provide a well plan to a drilling controls module of the second oilfield application;

monitoring, according to the sequence of events specified by the requirement, drilling of a wellbore using a drilling monitoring module of the second oilfield application to send drilling data to a drilling simulation module of the first oilfield application;

performing a simulation using the drilling simulation module to update the well plan based on the drilling data; and monitoring the operating parameter to prevent, during the drilling of the wellbore, the wellbore from performing at a level restricted based on the constraint.

18. The method of claim 17, further comprising the step of inputting data into the second oilfield application from a data repository.

19. The method of claim 17, wherein at least a portion of the application shell is automatically generated from a tool-kit.

20. The method of claim 17, wherein at least one of the oilfield application modules provides at least one selected from a group consisting of user interface function, display function, and business logic function based on the application shell.

21. The method of claim 20, wherein the user interface (UI) function comprises at least one selected from a group consisting of UI button, UI menu, UI form, form filling paradigm, advanced selector, and think ahead help.

22. The method of claim 20, wherein the display function comprises at least one selected from a group consisting of hierarchical data display, transparent layers, adaptive zooming paradigm, wireframe, storyboard, interactions to facilitate display on large or small devices, colorized composition, multiple data types for display, support for display component library, 2D and 3D drawing, fixed and adaptive documents, advanced typography, vector graphics, raster graphics, animation, data binding, audio, and video.

23. The method of claim 20, wherein the business logic function comprises at least one selected from a group consisting of generating reports, generating well plans, performing simulations, performing production operations, performing seismic operations, performing completions operations, and performing drilling operations.

24. A computer readable medium, embodying instructions executable by a computer to perform method steps for performing an oilfield operation of an oilfield having a subterranean formation for extracting fluid from an underground reservoir therein, the instructions comprising functionality to:

obtain an application shell for forming a first oilfield application;
obtain a plurality of oilfield modules, each of the plurality of oilfield modules adapted to perform at least one oilfield task of the first oilfield application,
   wherein the application shell comprises a constraint and a requirement,
   wherein the constraint specifies a restriction of the plurality of oilfield application modules restricting operation of a drilling equipment according to an operating parameter, and
   wherein the requirement specifies a sequence of events for the at least one oilfield task performed by each of the plurality of oilfield application modules;
load the plurality of oilfield modules into the application shell to form the first oilfield application;
encapsulate at least one of the plurality of the oilfield modules for compatibility with the application shell;
integrate the plurality of oilfield modules into a format for operability with the application shell;
perform, according to the sequence of events specified by the requirement, well planning using a well planning module of the plurality of oilfield modules to provide a well plan to a drilling controls module of the plurality of oilfield modules;
monitor, according to the sequence of events specified by the requirement, drilling of a wellbore using a drilling monitoring module of the plurality of oilfield modules to send drilling data to a drilling simulation module of the plurality of oilfield modules;
perform a simulation using the drilling simulation module to update the well plan based on the drilling data; and
monitor the operating parameter to prevent, during the drilling of the wellbore according to the well plan, the wellbore from performing at a level restricted based on the constraint.

25. A computer readable medium, embodying instructions executable by a computer to perform method steps for performing an oilfield operation of an oilfield having a subterranean formation for extracting fluid from an underground reservoir therein, the instructions comprising functionality to:

couple a first oilfield application to an application shell via an application programming interface and a linking module,
   wherein the application shell comprises a constraint and a requirement,
   wherein the constraint specifies a restriction of the plurality of oilfield application modules restricting operation of a drilling equipment according to an operating parameter, and
   wherein the requirement specifies a sequence of events for the at least one oilfield task performed by each of the plurality of oilfield application modules;
obtain a plurality of oilfield modules, each of the plurality of oilfield modules adapted to perform at least one oilfield task of a second oilfield application;
load the plurality of oilfield modules into the application shell to form the second oilfield application;
encapsulate at least one of the plurality of the oilfield modules for compatibility with the application shell;
integrate the plurality of oilfield modules into a format for operability with the application shell; and
perform the at least one oilfield task based on the first oilfield application and the second oilfield application by:
   performing, according to the sequence of events specified by the requirement, well planning using a well planning module of the first oilfield application to provide a well plan to a drilling controls module of the second oilfield application;
   monitoring, according to the sequence of events specified by the requirement, drilling of a wellbore using a drilling monitoring module of the second oilfield application to send drilling data to a drilling simulation module of the first oilfield application;
   performing a simulation using the drilling simulation module to update the well plan based on the drilling data; and
   monitoring the operating parameter to prevent, during the drilling of the wellbore, the wellbore from performing at a level restricted based on the constraint.

\* \* \* \* \*